(12) United States Patent
Bourova et al.

(10) Patent No.: US 7,008,892 B2
(45) Date of Patent: Mar. 7, 2006

(54) RAMAN-ACTIVE OPTICAL FIBER

(75) Inventors: Ekaterina Bourova, Boulogne-Billancourt (FR); Stephanie Blanchandin, Paris (FR); Jérome Garapon, Bourg-la-Reine (FR)

(73) Assignee: Alcatel, Paris (FR)

( * ) Notice: Subject to any disclaimer, the term of this patent is extended or adjusted under 35 U.S.C. 154(b) by 164 days.

(21) Appl. No.: 10/617,212

(22) Filed: Jul. 11, 2003

(65) Prior Publication Data

US 2004/0053768 A1    Mar. 18, 2004

(30) Foreign Application Priority Data

Aug. 26, 2002 (EP) .................................. 02360245

(51) Int. Cl.
*C03C 13/04* (2006.01)
*H01S 3/00* (2006.01)

(52) U.S. Cl. .................... 501/37; 501/10; 359/334; 385/142; 385/144

(58) Field of Classification Search ............... 501/37, 501/10; 385/123–128, 141, 142, 144; 359/334
See application file for complete search history.

(56) References Cited

U.S. PATENT DOCUMENTS

| | | | |
|---|---|---|---|
| 3,503,764 A | * | 3/1970 | Young .......................... 501/51 |
| 3,513,004 A | * | 5/1970 | Pfaender et al. ............... 501/78 |
| 4,790,619 A | | 12/1988 | Lines et al. |
| 4,932,752 A | * | 6/1990 | Krashkevich et al. ........ 385/142 |
| 5,284,807 A | * | 2/1994 | Komori et al. ................ 501/35 |
| 2005/0024713 A1 | * | 2/2005 | Bourova et al. ............. 359/334 |

FOREIGN PATENT DOCUMENTS

| | | | |
|---|---|---|---|
| EP | 0498425 | * | 12/1992 |
| EP | 0 248 517 B1 | | 11/1994 |
| SU | 1534979 | * | 4/1995 |

OTHER PUBLICATIONS

Masuda H et al: "Ultra-wide-band Raman amplifier using tellurite and silica fibres" Electronics Letters, IEE Stevenage, GB, vol. 38, No. 16, Aug. 1, 2002, pp. 867-868, XP006018643.

Patent Abstracts of Japan, vol. 2000, No. 21, Aug. 3, 2001, & JP 2001 109026 A ( Nippon Telgr & teleph Corp), Apr. 20, 2001.

Masuda H, et al: "Ultra-wide-band Hybrid tellurite/silica fiber Raman Amplifier" OFC 2002, THB6, pp. 388-390.

* cited by examiner

*Primary Examiner*—Karl Group
(74) *Attorney, Agent, or Firm*—Sughrue Mion, PLLC

(57) ABSTRACT

An optical fiber has a fiber core with a higher refractive index and a cladding surrounding the core with a lower refractive index. The fiber core is made of a multi-component oxide glass composition which consists of a glass-forming component and two Raman-active components. The glass former is $SiO_2$ and the Raman active components are of $Li_2O$ and $Nb_2O_5$. The concentration of the glass former is between 30 and 90 mol % and of the Raman active components is up to 50 mol % in total. The composition may further include a glass-modifying component of alkaline such as $Li_2O$, $Na_2O$, $K_2O$, $Rb_2O$, $Cs_2O$ or earth-alkaline such as BeO, MgO, CaO, SrO, BaO in a concentration of up to 40 mol %.

13 Claims, 1 Drawing Sheet

RAMAN-ACTIVE OPTICAL FIBER

The invention is based on a priority application EP 02 360 245.1 which is hereby incorporated by reference.

FIELD OF THE INVENTION

The present invention relates to the field of optical fibers and more particularly to a device comprising a Raman-active optical fiber for amplifying optical signals by stimulated Raman scattering.

BACKGROUND OF THE INVENTION

It has been known for some time that optical fibers can be advantageously used to amplify, by means of stimulated Raman scattering, radiation guided through the fiber. Raman amplifiers and lasers appear to be excellent components for the use in transmission systems and especially in high-capacity photonic networks designed to provide various data-based broadband services.

Today's Raman amplifiers and lasers typically use silica, germano-silicate, or phospho-silicate based fibers. The Raman spectra of silica and germano-silica based fibers exhibit a single peak and the full bandwidth of Raman Stokes shift does not exceed 100 nm when pumped at 1.5 µm. Phospho-silicate fibers have a twin-peaked spectrum that shows one complementary localized shift at 300 nm when pumped at 1.5 µm.

Some proposals have been made so far for non high silica content based glass systems. EP 248 517 B1 discloses glass compositions for use in a Raman amplifier which contain $GeO_2$ or $SiO_2$ as glass-forming first component and a heavy metal oxide second component such as PbO, $BiO_{1.5}$, $SbO_{1.5}$, $TlO_{0.5}$. These fibers have a silica-like bandwidth of Raman shift but are more efficient in terms of Raman gain coefficient.

The conference article "Ultra-wideband hybrid tellurite/silica fiber Raman amplifier" by H. Masuda, OFC 2002, ThB6, discloses tellurite-based glasses with a twin-peaked spectrum, which exhibit a large gain coefficient and bandwidth up to 170 nm when pumped at 1.5 µm.

It is an object of the present to provide a Raman-active glass composition for use in Raman amplifiers or lasers with improved flatness and bandwidth of Raman gain.

SUMMARY OF THE INVENTION

The object is achieved by a multi-component oxide glass composition with a first major component as glass-former of $SiO_2$ between 30 and 90 mol %, a Raman-active component system of $Li_2O$ and $Nb_2O_5$ in a concentration of up to 50 mol % in total. Preferably, the composition further includes a glass modifier component of alkaline ($Li_2O$, $Na_2O$, $K_2O$) and/or earth-alkaline (MgO, CaO, BaO etc.) in a concentration of up to 40 mol %.

The most significant advantages of the present invention as compared with previously proposed compositions are the flatness and seamless Raman gain. We obtained a Stokes shift of up to 200 nm when pumped at 1.4 µm. This is two times larger than with known silica based fibers and 14% larger that with tellurite based fibers. Moreover, the Raman gain is two times flatter than in tellurite-based fiber. Additionally, a silicate based fiber according to the invention would be more compatible with standard silica transmission fibers than a tellurite based fiber.

The term "gain flatness" refers to the change in the shape of the gain spectrum over a particular wavelength range. A flat gain means a substantially equal gain for all wavelengths over the wavelength range.

BRIEF DESCRIPTION OF THE DRAWINGS

A preferred embodiment of the present invention will now be described with reference to the accompanying drawings in which.

DETAILED DESCRIPTION OF THE INVENTION

In a preferred embodiment, an optical fiber has a fiber core with a higher refractive index and a cladding surrounding the core with a lower refractive index. According to the invention the fiber core is made of a multi-component oxide glass composition of a glass-forming component and a Raman-active component. The glass former is $SiO_2$ and the Raman active component is a system of $Li_2O$ and $Nb_2O_5$. The concentration of the glass former may be selected in the range between 30 and 90 mol % and the Raman active component may have a concentration of up to 50 mol %. The cladding may be of a silicate-based glass.

The invention is based on the discovery that the joint positive influence of $Nb_2O_5$ and $Li_2O$ associated in the silica glass network increases Raman gain flatness and improves Raman gain bandwidth.

The Raman characteristics of the composition strongly depend on the ration between the two Raman active components $Li_2O$ and $Nb_2O_5$ and the ration can therefore be chosen according to the intended application. For example, for an application in lumped Raman amplifiers, the ration between $Li_2O$ and $Nb_2O_5$.can be adjusted for maximum Raman gain flatness. Conversely, for an application in a Raman laser, the ration can be chosen for maximum Raman shift and gain intensity at this shift. It is to be noted that best ration between the two Raman active components in the ranges defined above for a particular intended use will present no problem to those skilled in the art and can be found out without undue experimentation.

The multi-component glass composition may further include one or more glass modifier components of alkaline such as $Li_2O$, $Na_2O$, $K_2O$, $Rb_2O$, $Cs_2O$ and/or earth-alkaline such as BeO, MgO, CaO, SrO, BaO in a concentration of up to 40 mol %. The modifier component could be Raman active components as well but their principal role is to modifier the glass structure and mechanical or others properties. The $Li_2O$ can play a double role as Raman active components and as glass modifier. This means that an additional glass modifier is not mandatory to the invention.

In the preferred embodiment, the fiber core has a glass composition of 60% $SiO_2$, 10% $Li_2O$, 10%$Nb_2O_5$ and additional 20% of $Na_2O$, which may also be replaced by further 20% $Li_2O$.

The fiber can be manufactured according to any known technique such as the double crucible method, the rod in tube method or the soft core method. The pre-forms of the fiber core for the latter two techniques can be produced according to the classical rotational method or MCVD technique.

Figure 1:
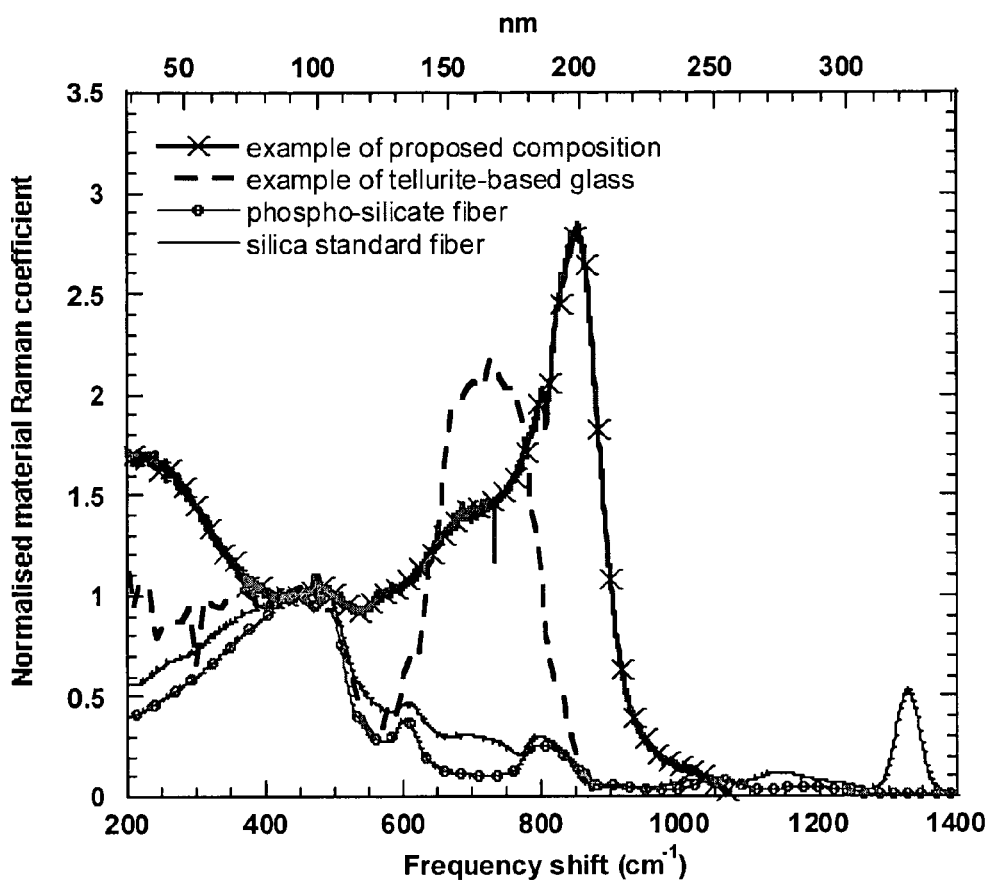
FIG. 1 shows a comparison of Raman gain spectra between the proposed glass composition and known glasses and FIG. 2 shows a block diagram of a Raman amplifier having an optical fiber made of the new glass composition.

FIG. 1 compares the normalized material Raman coefficient for silica, phoshosilicate and tellurite based glasses with the proposed composition. The material Raman coefficients are normalized to the intensity of the silica peak at 440 $cm^{-1}$. The proposed compositions have been produced by classical melting technique and Raman gain coefficient has been measured on the bulk sample.

The material Raman gain coefficient measured here presents the room temperature cross section of the material $\sigma_{300}(\Delta\upsilon)$, which reduced to zero Kelvin $\sigma_0(\Delta\upsilon)$ gives the effective frequency shift dependent stimulated Raman scattering coefficient $g_{eff}(\Delta\upsilon)$:

$$g_{eff}(\Delta\upsilon) = \sigma_0(\Delta\upsilon)\lambda^3/c^2 hn(\upsilon)^2,$$

where $n(\upsilon)$ is the refractive index and l, c, h have their usual meaning.

Therefore, the net Raman gain of an optical fiber is given by:

$$G = 4.34[(P_p/A_{eff})L_{eff}g_{eff}-(\alpha'L)],$$

Where
 $P_p$ is the pump power;
 $A_{eff}$ is the effective area for Raman gain;
 $L_{eff}$ is the effective fiber length;
 $G_{eff}(\Delta\upsilon)$ is the effective frequency shift dependent stimulated Raman scattering coefficient;
 a' is the loss coefficient; and
 L is the fiber length.

The glass composition can further be improved, either from the point of view of glass stability and characteristic parameters or even for Raman properties, using others oxide components such as: $P_2O_5$, $B_2O_3$, $Al_2O_3$, $Ta_2O_5$, $V_2O_5$, $As_2O_3$, $GeO_2$, $TiO_2$, $ZrO_2$, $PbO$, $Bi_2O_3$, $Mo_2O_3$, $WO_3$, $SnO_2$, $Sb_2O_3$, $Ga_2O_3$, $In_2O_3$, $TeO_2$, or sulfide components.

The use of this fiber in optical devices opens large possibilities for multi-band amplifiers and for Raman tunable lasers. The proposed compositions are also promising for non-linear optical applications. It has been shown that heat treatment induces the crystallization of small $LiNbO_3$ particles, which non linear optical susceptibilities are at least one order of magnitude greater than in undoped silica. Such compositions thus appear suitable for the design of active components, like tunable fiber Bragg grating.

The Raman-active fiber according to the present invention may be used whenever efficient Raman amplification of fiber-guided optical signals is required (typically in the range 0.5 μm to 4.0 μm and in particular in the so-called C and L bands having a wavelength range between 1535 nm to 1565 nm and 1565 nm to 1615 nm, respectively).

Figure 2:
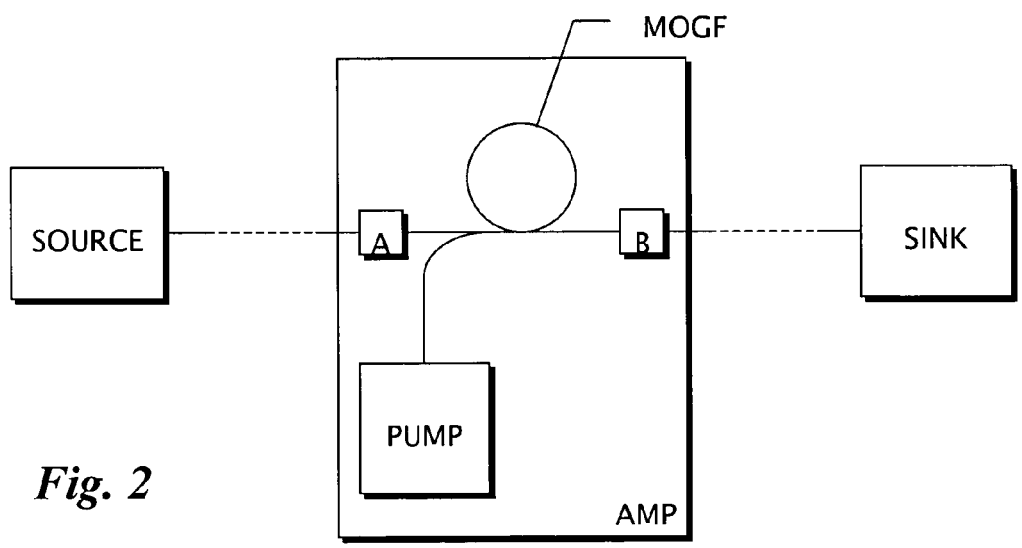

FIG. 2 shows schematically an optical fiber communications system which uses Raman amplification to compensate for the signal attenuation in the transmission path. A signal source SOURCE (e.g., a modulated semiconductor laser) is connected to a signal sink SINK via an optical fiber link (e.g., conventional SiO2-based low loss single mode fiber). The fiber link comprises a Raman amplifier AMP to compensate for signal attenuation. The amplifier is basically consists of a Raman-active multi-component oxide glass fiber MOGF of the type described above, which may be winded up in the amplifier housing, and a pump source PUMP coupled to the Raman-active fiber.

The pump source PUMP can be a single source or it can comprise a battery of sources, e.g., light emitting diodes. The pump radiation can be cw or pulsed, is of shorter wavelength than the signal radiation by an amount that typically corresponds substantially to the Stokes shift that results in maximum Raman scattering, and can be coupled into the Raman-active fiber so as to be co- and/or counter-propagating with the signal radiation. Furthermore, at least in some cases it may be advantageous to provide filter means (A, B) for selectively removing pump radiation from the transmission path, to prevent accumulation of pump frequency background radiation.

What is claimed is:

1. A Raman-active optical fiber having a core with a higher refractive index and a cladding with a lower refractive index, said core comprising a multi-component oxide glass composition comprising:
 a glass former component made of $SiO_2$ having a concentration of between 30 and 90 mol %; and
 two Raman-active components of $Li_2O$ and $Nb_2O_5$ in a concentration of up to 50 mol % in total;
 wherein said Raman-active optical fiber has areas comprising $LiNbO_3$ crystallization particles induced by heat treatment of the fiber.

2. A fiber according to claim 1, wherein said cladding is made of silicate glass.

3. A fiber according to claim 1, wherein said multi-component oxide glass composition further comprises at least one glass modifier component of alkaline or earth-alkaline in a concentration of up to 40 mol %.

4. A fiber according to claim 3, wherein said glass modifier component is selected from the group consisting of $Li_2O$, $Na_2O$, $K_2O$, $Rb_2O$, $Cs_2O$, BeO, MgO, CaO, SrO, BaO.

5. A fiber according to claim 1, wherein said multi-component oxide glass composition further comprises at least one other oxide component selected from the group consisting of $P_2O_5$, $B_2O_3$, $Al_{23}$, $Ta_2O_5$, $V_2O_5$, $As_2O_3$, $GeO_2$, $TiO_2$, $ZrO_2$, $PbO$, $Bi_2O_3$, $Mo_2O_3$, $WO_3$, $SnO_2$, $Sb_2O_3$, $Ga_2O_3$, $In_2O_3$, $TeO_2$ in a concentration of up to 40 mol %.

6. A fiber according to claim 1, wherein said multi-component oxide glass composition further comprises at least one sulfide component.

7. A Raman amplifier or laser, comprising a pump source coupled to a Raman-active optical fiber,
 said Raman-active optical fiber having a core with a higher refractive index and a cladding with a lower refractive index, and
 said core comprising a multi-component oxide glass composition comprising:
 a glass former component made of $SiO_2$ having a concentration of between 30 and 90 mol %; and
 two Raman-active components of $Li_2O$ and $Nb_2O_5$ in a concentration of up to 50 mol % in total.

8. A Raman amplifier or laser according to claim 7, wherein said cladding is made of silicate glass.

9. A Raman amplifier or laser according to claim 7, wherein said Raman-active optical fiber has areas comprising $LiNbO_3$ crystallization particles induced by heat treatment of the fiber.

10. A Raman amplifier or laser according to claim 7, wherein said multi-component oxide glass composition further comprises at least one glass modifier component of alkaline or earth-alkaline in a concentration of up to 40 mol %.

11. A Raman amplifier or laser according to claim 10, wherein said glass modifier component is selected from the group consisting of $Li_2O$, $Na_2O$, $K_2O$, $Rb_2O$, $Cs_2O$, BeO, MgO, GaO, SrO, BaO.

12. A Raman amplifier or laser according to claim 7, wherein said multi-component oxide glass composition further comprises at least one other oxide component selected from the group consisting of $P_2O_5$, $B_2O_3$, $Al_2O_3$, $Ta_2O_5$, $V_2O_5$, $As_2O_3$, $GeO_2$, $TiO_2$, $ZrO_2$, $PbO$, $Bi_2O_3$, $Mo_2O_3$, $WO_3$, $SnO_2$, $Sb_2O_3$, $Ga_2O_3$, $In_2O_3$, $TeO_2$ in a concentration of up to 40 mol %.

13. A Raman amplifier or laser according to claim 7, wherein said multi-component oxide glass composition further comprises at least one sulfide component.

* * * * *